US012547434B2

(12) United States Patent
Lee et al.

(10) Patent No.: US 12,547,434 B2
(45) Date of Patent: Feb. 10, 2026

(54) METHOD FOR RECORDING AND EXECUTING RPA TASK

(71) Applicant: SAMSUNG SDS CO., LTD., Seoul (KR)

(72) Inventors: Seung Woo Lee, Seoul (KR); Hyo Young Kim, Seoul (KR); Jae Cheol Lee, Seoul (KR); Hong Ryeol Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 389 days.

(21) Appl. No.: 18/202,476

(22) Filed: May 26, 2023

(65) Prior Publication Data

US 2023/0385086 A1 Nov. 30, 2023

(30) Foreign Application Priority Data

May 26, 2022 (KR) .......................... 10-2022-0064795
Jul. 29, 2022 (KR) .......................... 10-2022-0094791

(51) Int. Cl.
*G06F 9/451* (2018.01)
*G06F 9/48* (2006.01)

(52) U.S. Cl.
CPC ............ *G06F 9/452* (2018.02); *G06F 9/4881* (2013.01)

(58) Field of Classification Search
CPC .............................. G06F 9/452; G06F 9/4881
See application file for complete search history.

(56) References Cited

U.S. PATENT DOCUMENTS

| 6,434,629 | B1* | 8/2002 | Stearns | G06F 9/45512 |
| | | | | 700/86 |
| 2021/0158256 | A1* | 5/2021 | Negulescu | G06F 16/23 |
| 2022/0100539 | A1* | 3/2022 | Madkour | G06F 9/5072 |
| 2023/0236855 | A1* | 7/2023 | Oancea | G06F 9/451 |
| | | | | 715/740 |

FOREIGN PATENT DOCUMENTS

| KR | 10-2227687 B1 | 3/2021 |
| KR | 10-2337270 B1 | 12/2021 |

* cited by examiner

*Primary Examiner* — Viet D Vu
(74) *Attorney, Agent, or Firm* — Sughrue Mion, PLLC

(57) ABSTRACT

A method for recording robotics process automation (RPA) and executing RPA is provided. The method for recording RPA task may comprise receiving object information on an object selected by a user input for selecting the object inside a window region of an external desktop from an agent of the external desktop in response to the user input in a recording situation of the RPA task and adding action information to specification data of the RPA task by using the received object information.

15 Claims, 8 Drawing Sheets

METHOD FOR RECORDING AND EXECUTING RPA TASK

CROSS-REFERENCE TO RELATED APPLICATION

This application claims priority from Korean Patent Application No. 10-2022-0064795 filed on May 26, 2022, in the Korean Intellectual Property Office, and Korean Patent Application No. 10-2022-0094791 filed on Jul. 29, 2022, in the Korean Intellectual Property Office, and all the benefits accruing therefrom under 35 U.S.C. 119, the contents of which in its entirety are herein incorporated by reference.

BACKGROUND

1. Technical Field

The present disclosure relates to a robotics process automation (RPA) technology, and more particularly, to a method for recording and executing a series of actions performed by the RPA technology.

2. Description of the Related Art

Robotic process automation (RPA), which is a technology for automating tasks repeatedly performed by a user, is one of information technologies (IT) that have recently received great attention. A series of actions performed by the RPA technology may be referred to as RPA tasks. The RPA task may be executed at various process instances. For example, the RPA task may be executed in an operating system (OS) installed in a server or in an operating system of a user terminal.

Meanwhile, as a situation in which a user can use various terminal devices is fixed, an external desktop access technology is provided, which supports the user to perform a task by accessing a computing device used by himself/herself through an external computing device. For example, a remote desktop connection function is provided. That is, a computing device for generating a desktop provided by an operating system, and a computing device for displaying the desktop screen and manipulating a user input can be separated from each other. The external desktop access technology is widely used as being evolved as a virtual desktop infrastructure (VDI) technology.

However, there is inconvenience at the point where the RPA technology and the external desktop access technology are combined. For example, when an object inside an external desktop window is selected in an RPA task recording situation, since detailed information on the selected object cannot be known, the action related to the object inside the external desktop window is difficult to be included in the RPA task. This limitation on action that may be included in the RPA task limits the range of repetitive operations that can be automated by being defined as the RPA task.

SUMMARY

An object of the present disclosure is to provide a method for recording a robotics process automation (RPA) task, which is capable of accurately recording an action that uses an object of an external desktop, and a computing system to which the method is applied.

Another object of the present disclosure is to provide a method for executing an RPA task, which is capable of accurately executing the RPA task including an action that uses an object of an external desktop, and a computing system to which the method is applied.

Other object of the present disclosure is to provide a method for executing an RPA task, which is capable of accurately execute the RPA task even though an object related to an action included in the RPA task is present in an external desktop which is not yet connected to a desktop in which the RPA task is executed, and a computing system to which the method is applied.

The objects of the present disclosure are not limited to those mentioned above and additional objects of the present disclosure, which are not mentioned herein, will be clearly understood by those skilled in the art from the following description of the present disclosure.

According to an aspect of the inventive concept, there is a provided method for recording an RPA task, performed by a computing device. The method may comprise receiving object information on an object selected by a user input for selecting the object inside a window region of an external desktop from an agent of the external desktop in response to the user input in a recording situation of the RPA task and adding action information to specification data of the RPA task by using the received object information.

In some embodiments, receiving the object information may include transmitting an object extraction mode switching request to the agent in response to detecting that a cursor enters the window region of the external desktop in the recording situation of the RPA task.

In some embodiments, receiving the object information may further include receiving the object information generated by the agent switched to an object extraction mode.

In some embodiments, receiving the object information may further include receiving execution environment information of the external desktop, which is generated by the agent.

According to yet another aspect of the inventive concept, there is a provided method for recording an RPA task, performed by a computing device. The method may comprise acquiring specification data of the RPA task, identifying each action constituting the RPA task by using the acquired specification data, determining an execution environment of the identified action, determining an execution device of the identified action as any one of the computing device and an external device corresponding to an external desktop connected to the computing device by using the determined execution environment, transmitting data for execution of the identified action to an agent of the external desktop connected to the computing device when the execution device of the identified action is determined as the external device, and repeating the determining the execution environment, the determining the execution device of the identified action as any one of the computing device and the external device and the transmitting the data for execution of the identified action in accordance with the order of each identified action.

In some embodiments, the method may further comprise receiving execution environment information from the agent of each external desktop connected to the computing device, wherein the determining the execution device of the identified action as any one of the computing device and the external device may include determining whether the computing device can execute the identified action by using the execution environment of the identified action, determining the execution device of the identified action as the computing device when it is determined that the computing device is capable of executing the identified action, and determining the execution device of the identified action as one of respective external desktops by using the received execution environment information when it is determined that the identified action is not capable of being executed in the computing device.

In some embodiments, the method may further comprise receiving a user input indicating the execution of the RPA task, wherein the receiving the execution environment information may include receiving the execution environment information in response to the receiving the user input.

In some embodiments, the execution environment information may include execution environment type information, installed application information, resolution information, and hardware available resource information.

In some embodiments, determining the execution device of the identified action as one of the respective external desktops by using the received execution environment information may include determining, as the execution device of the identified action, an external desktop having execution environment information in which the execution environment type information, the installed application information, the resolution information and the hardware available resource information among the received execution environment information are matched with the execution environment of the identified action, and determining, as the execution device of the identified action, an external desktop satisfying only some essential information among the execution environment type information, the installed application information, the resolution information and the hardware available resource information when there is no external desktop having execution environment type information in which the execution environment type information, the installed application information, the resolution information and the hardware available resource information among the received execution environment information are matched with the execution environment of the identified action.

In some embodiments, determining the execution device of the identified action as one of the respective external desktops by using the received execution environment information may include displaying a notification message and stopping execution of the RPA task when there is no external desktop matched with the received execution environment information.

In some embodiments, determining the execution device of the identified action as one of the respective external desktops by using the received execution environment information may include determining, as the execution device of the identified action, an external desktop, which is matched with the received execution environment information, among connectable desktops previously registered by a user of the computing device when there is no external desktop matched with the received execution environment information.

In some embodiments, the determining, as the execution device of the identified action, the external desktop, which is matched with the received execution environment information, among connectable desktops previously registered by the user of the computing device may include newly connecting the computing device to connectable desktops previously registered by the user of the computing device when there is no external desktop matched with the received execution environment information, and determining, as the execution device of the identified action, an external desktop matched with the received execution environment information among the newly connected external desktops.

According to still another aspect of the inventive concept, there is a provided computing system, which comprises a communication interface connected with a user terminal, a processor, and a memory storing a computer program loaded on the processor, wherein the computer program may include an instruction for receiving specification data of an RPA task through the communication interface, an instruction for receiving an execution command of the RPA task from the user terminal, and an instruction for executing the RPA task in response to the reception of the execution command of the RPA task, the instruction for executing the RPA task may include an instruction for identifying each action constituting the RPA task by using the acquired specification data, an instruction for determining an execution environment of the identified action, an instruction for determining an execution device of the identified action as any one of the computing system and an external device corresponding to an external desktop connected to the computing system by using the determined execution environment, an instruction for transmitting data for execution of the identified action to an agent of the external desktop displayed on the computing system when the execution device of the identified action is determined as the external device, and an instruction for repeating the determining the execution environment, the determining the execution device of the identified action as any one of the computing system and the external device and the transmitting the data for execution of the identified action in accordance with the order of each identified action.

In some embodiments, the computing system may provide a remote desktop service to the user terminal.

According to still another aspect of the inventive concept, there is a provided method for executing RPA task, performed by a computing device. The method may comprise acquiring specification data of the RPA task, identifying each action constituting the RPA task by using the acquired specification data, determining an execution environment of the identified action, determining an execution device of the identified action as any one of the computing device and an external device corresponding to an external desktop connected to the computing device by using the determined execution environment, repeating the determining the execution environment and the determining the execution device of the identified action as any one of the computing device and the external device for each identified action, executing the identified action when the determined execution device of the identified action is the computing device, transmitting data for execution of the identified action to an agent corresponding to the external device when the determined execution device of the identified action is the external device, and repeating the executing the identified action and the transmitting the data for execution of the identified action to the agent corresponding to the external device in accordance with the order of each identified action.

In some embodiments, determining the execution device of the identified action as any one of the computing device and an external device corresponding to an external desktop connected to the computing device may include displaying a notification message and stopping execution of the RPA task when the execution device of the identified action cannot be determined.

In some embodiments, determining the execution device of the identified action as any one of the computing device and an external device corresponding to an external desktop connected to the computing device may include determining, as the execution device of the identified action, an external desktop, which is matched with the received execution environment information, among connectable desktops previously registered by a user of the computing device, and newly connecting the computing device to the external desktop determined as the execution device.

According to still another aspect of the inventive concept, there is a provided method for executing RPA task, performed by a computing device. The method may comprise acquiring specification data of the RPA task, identifying each action constituting the RPA task by using the acquired specification data, determining a comprehensive execution environment of the RPA task by using an execution environment of the identified action, determining an execution device of the RPA task as the computing device when an execution environment of the computing device is matched with the determined comprehensive execution environment, and determining an external desktop matched with the determined comprehensive execution environment among external desktops connected to the computing device as the execution device of the RPA task and transmitting the specification data of the RPA task to the execution device of the RPA task when at least a portion of the execution environment of the computing device is not matched with the determined comprehensive execution environment.

In some embodiments, determining the comprehensive execution environment of the RPA task may include determining the comprehensive execution environment by synthesizing all of execution environments of the identified action under 'AND conditions'.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE DISCLOSURE

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. In describing the present disclosure, when it is determined that the detailed description of the related well-known configuration or function may obscure the gist of the present disclosure, the detailed description thereof will be omitted. Hereinafter, embodiments of the present disclosure are described with reference to the accompanying drawings.

A robotics process automation (RPA) system according to one embodiment of the present disclosure will be described with reference to FIGS. 1 and 2.

The RPA system according to the present embodiment may be configured as one or more computing systems to which RPA technology for automation of repetitive tasks is applied. In addition, the RPA system according to the present embodiment may be associated with one or more computing systems that support manipulation of an external desktop.

Figure 1:
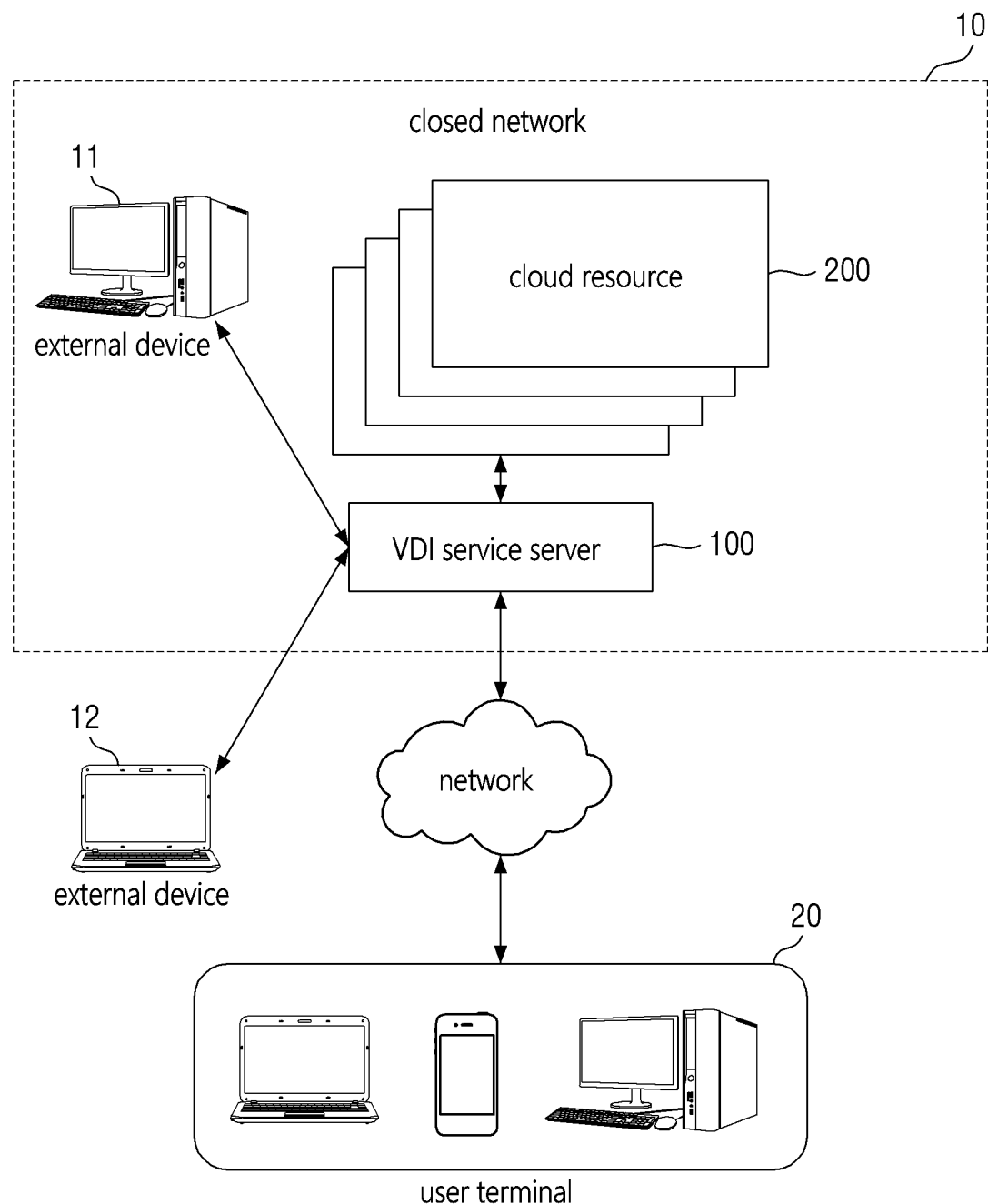
FIGS. 1 and 2 are schematic views illustrating a robotics process automation (RPA) system according to one embodiment of the present disclosure.

As shown in FIG. 1, the RPA system according to the present embodiment may include a user terminal 20, external devices 11 and 12, and a cloud resource 200.

The user terminal 20 is a computing device for displaying an external desktop and manipulating the displayed external desktop, and is a computing device used by a user. On the other hand, the external devices 11 and 12 and the cloud resource 200 are computing devices in which an operating system (OS) providing the external desktop is installed. That is, the external desktop is that an execution-side computing device and a manipulation-side computing device are separated from each other.

As described above, the 'external desktop' may be understood as a software instance supporting a user manipulation in the form of a graphic user interface (GUI). For example, a user who uses a first computing device may remotely access a second computing device to display a window of a desktop screen provided by an operating system of the second computing device on a desktop screen provided by an operating system of the first computing device. In this case, the desktop screen provided by the operating system of the second computing device may be understood as an example of the 'external desktop'.

As will be described later, 'the external desktop' is not necessarily displayed. That is, the computing device for executing the RPA task or recording the RPA is connected to an agent installed in the 'external desktop' to mutually transmit and receive data. As a result, when the computing device may transmit information on an action to be executed to the agent of the external desktop at the time when the RPA task is executed or the agent of the external desktop may transmit information on a selected object to the computing device at the time when the RPA task is recorded, all software instances supporting the user manipulation in the form of a graphic user interface satisfying such a condition may be the 'external desktop'.

In some embodiments, the external desktop may be provided using a Virtual Desktop Infrastructure (VDI) technique. At this time, the user terminal 20 may generate and display a window of the external desktop on the desktop screen of the user terminal 20 by accessing a VDI service server 100 servicing the provision of the external desktop.

An operating system installed in a virtual machine (VM) provisioned in the cloud resource 200 may generate the external desktop. Also, a container generated on the operating system of the virtual machine or the operating system of the external device 11 may generate the external desktop.

The cloud resource 200 may be positioned inside a closed network 10 in which packet transmission and reception to and from an external network is filtered by one or more firewall systems (not shown). That is, the cloud resource 200 may be a hardware resource constituting a private cloud system for a company.

The external device 11 may be a desktop PC or notebook PC positioned inside the closed network 10. An operating system installed in the external device 11 may generate the external desktop. In some use examples, an employee positioned outside the company may generate a desktop screen of its desktop PC 11 positioned inside the company on a desktop screen of the notebook PC owned by himself or herself as the external desktop.

Also, the external device 12 may be a desktop PC or notebook PC positioned outside the closed network 10. An operating system installed in the external device 12 may generate the external desktop. In some use examples, an employee positioned outside the company may display a desktop screen of a desktop PC 12 installed in his/her home on a desktop screen of a notebook PC owned by himself/herself and generate the desktop screen as an external desktop.

Figure 2:
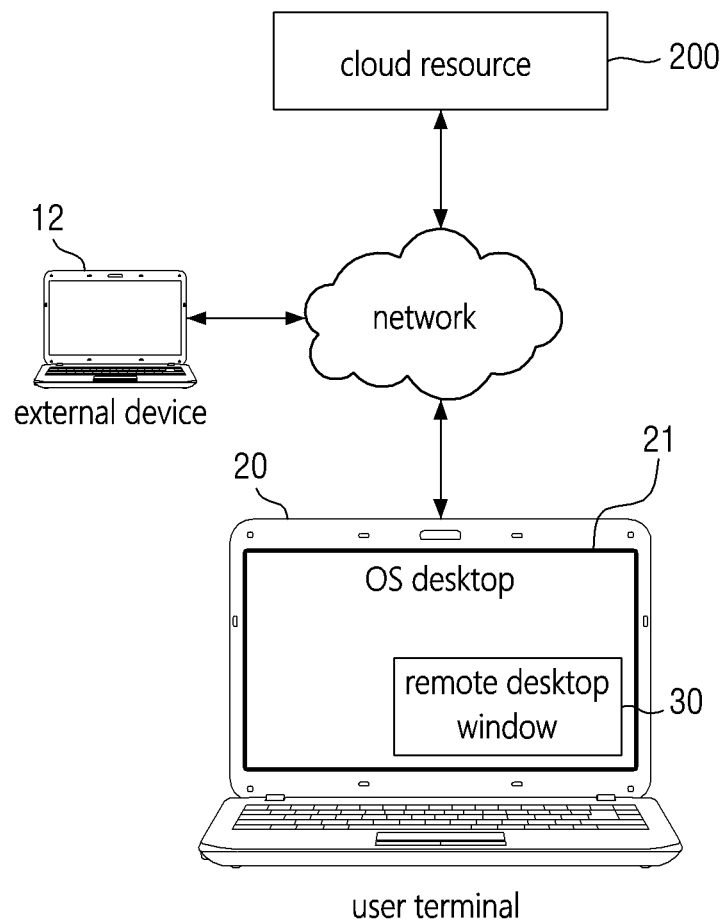

Meanwhile, as shown in FIG. 2, a remote desktop window 30 may be generated on a desktop screen 21 of an operating system installed in the user terminal 20 without using the VDI technique. The 'external desktop' described herein may be understood to be substantially the same meaning as a commonly used 'remote desktop'. As described above, the remote desktop window 30 may be the desktop screen of the operating system installed in the external device 12 or the desktop screen of the operating system installed in the virtual machine (not shown) provisioned in the cloud resource 200.

Also, in some embodiments, the OS desktop 21 itself described herein may be also an external desktop. For example, an external desktop window may be generated once again in an external desktop generated using the VDI technique. In this way, it is understood that the concept of the external desktop is a relative concept according to a parent-child relationship with a subject who created the screen of the external desktop.

Hereinafter, a computing device for providing an external desktop will be referred to herein as an 'external device'. For example, a desktop PC shop or a notebook PC inside the closed network, a desktop PC shop or a notebook PC outside the closed network, a virtual machine provisioned in the cloud resource or a container environment generated in the virtual machine may be the external device.

The RPA system according to the present embodiment may support recording of an RPA task including an action using an object included in an external desktop and execution of the RPA task.

The RPA task may be a full remote RPA task in which all actions use an object of a remote desktop, or may be a hybrid RPA task in which some actions use an object of a remote desktop and the other actions use an object of a desktop of an operating system of the user terminal.

That is, the RPA system according to the present embodiment provides excellent scalability which supports recording and execution regardless of whether an action included in the RPA task manipulates an object of a certain desktop. This scalability will allow a user of the RPA system to automate a variety of repetitive operations.

The external device of the RPA system according to the present embodiment may always execute an agent. For example, the agent may be always executed in a background together with booting of the operating system of the external device. To this end, agent binary for each type of each operating system may be deployed and executed in advance. In addition, the VDI service server 100 described with reference to FIG. 1 may manage the deployment and execution of the agent binary.

The operation of the RPA system according to the present embodiment will be described.

First, an operation related to recording of the RPA task of the RPA system according to the present embodiment will be described. The user terminal 20 receives object information on an object selected by a user input from the agent of the external desktop in response to the user input for selecting an object inside a region of the window 30 of the external desktop in a recording situation of the RPA task. In addition, the user terminal 20 adds action information to specification data of the RPA task by using the received object information. When there is a user input for selecting an object of the desktop 21 of the operating system of the user terminal, the user terminal 20 generates action information including information on the selected object and adds action information to the specification data of the RPA task.

The user terminal 20 may repeat the addition of action information using the object information received from the agent of the external desktop or action information using the object information generated by itself to the specification data of the RPA task while recording of the RPA task is being performed. When recording ends through the user input to the user terminal 20, the specification data of the RPA task may be also completed.

The specification data of the RPA task may be a text of a predefined format. For example, the specification data of the RPA task may have a predefined mark-up language-based format. For example, the specification data of the RPA task may be an XML-based script, and each action defining the RPA task may be hierarchically defined as a tag of a specific level. In addition, since each action defining the RPA task may have an execution order, a tag defining each action will be placed inside the specification data of the RPA task in accordance with the execution order.

First, an operation related to the execution of the RPA task of the RPA system according to the present embodiment will be described.

The user terminal 20 may receive an execution command of a specific RPA task from a user. The user terminal 20 may acquire the specification data of the specific RPA task and identify each action constituting the RPA task. In addition, the user terminal 20 may determine an execution environment of the identified action. In some embodiments, information on the execution environment of each action may be included in the specification data in a predefined format, and the user terminal 20 may determine an execution environment of each action by using the information included in the specification data.

The user terminal 20 may determine an execution device of the identified action as any one of the computing device and the external device corresponding to the external desktop connected to the computing device by using the determined execution environment.

In some embodiments, the external device may be any computing device that provides the external desktop connected to the computing device, regardless of whether the external desktop window is displayed on the desktop screen of the computing device.

In some other embodiments, the external device is an external desktop connected to the computing device, and may be limited to the computing device that provides the external desktop on which the external desktop window is displayed on the desktop screen of the computing device.

The user terminal 20 may transmit data for execution of the identified action to the agent of the external desktop displayed on the computing device when the execution device of the identified action is determined as an external device and perform the identified action when the execution device of the identified action is determined as the user terminal 20.

Also, the user terminal 20 may repeat actions of determining an execution environment, determining the execution device of the identified action as one of the computing device and the external device and transmitting data for execution of the identified action in accordance with the order of each action.

As described above, the RPA system according to the present embodiment may determine a subject for each action constituting the RPA task, may execute the corresponding action by itself when the subject is the computing device for executing the RPA task, and may execute the corresponding action by transmitting data for execution of the corresponding action to the agent of the external desktop when the subject is the external desktop. That is, the RPA system according to the present embodiment may separately process the RPA task in a unit of each action.

Meanwhile, in a specific use example, an execution device matched with a corresponding execution environment may not exist in a specific action of the RPA task. That is, both the operating system of the user terminal 20 and any external desktop to which the user terminal 20 is connected may not satisfy the execution environment required for the specific action. In this case, the user terminal 20 may display a notification message indicating that execution of the specific action is impossible and stop the execution of the RPA task.

Meanwhile, in a situation in which execution of the specific action is impossible, among the actions included in the RPA task, the actions prior to the specific action of which execution is not impossible will be normally executed. That is, a situation in which only a partial action of the RPA task is executed may occur. It may be preferable that the RPA task is entirely executed or not entirely executed. That is, similarly to atomicity which transaction in the field of database should have, it may be preferable that the execution of the RPA task also satisfies the atomicity.

In order to satisfy the atomicity in the execution of RPA task, the RPA system according to the present embodiment may previously check whether all actions included in the RPA task can be executed before the execution of the RPA task starts. To this end, the user terminal 20 may perform the determination as any one of the user terminal 20 and the external device by using the execution environment of each action of the RPA task as the previous checking. At this time, when any one action in which the execution device cannot be determined exists, the user terminal 20 may display a notification message and stop the execution of the RPA task.

In order to satisfy the atomicity in the execution of RPA task, the user terminal 20 of the RPA system according to the present embodiment may identify each action constituting the RPA task by using the specification data of the RPA task, determine a comprehensive execution environment of the RPA task by using the execution environment of the identified action, determine the execution device of the RPA task as the computing device when the execution environment of the computing device is matched with the determined comprehensive execution environment, determine the external desktop matched with the determined comprehensive execution environment among the external desktops of the external desktop window displayed in the computing device as the execution device of the RPA task when at least a portion of the execution environment of the computing device is not matched with the determined comprehensive execution environment, and may transmit the specification data of the RPA task to the execution device of the RPA task.

Meanwhile, the RPA system according to the present embodiment may extend the external desktop used for the execution of the RPA task to a portion in which instantiation is not performed. It is assumed that a first user has a first external desktop having an access right when a first user executes the RPA task. Even though the first external desktop is not instantiated on a desktop screen of a user terminal used by the first user, a first action may be executed through manipulation of the first external desktop when the first action included in the RPA task to be executed by the first user uses the object of the first external desktop. To this end, the RPA system according to the present embodiment may automatically instantiate the first external desktop in the user terminal 20. That is, the user terminal 20 may automatically generate the window of the first external desktop by accessing the first external desktop for the execution of the RPA task.

Figure 3:
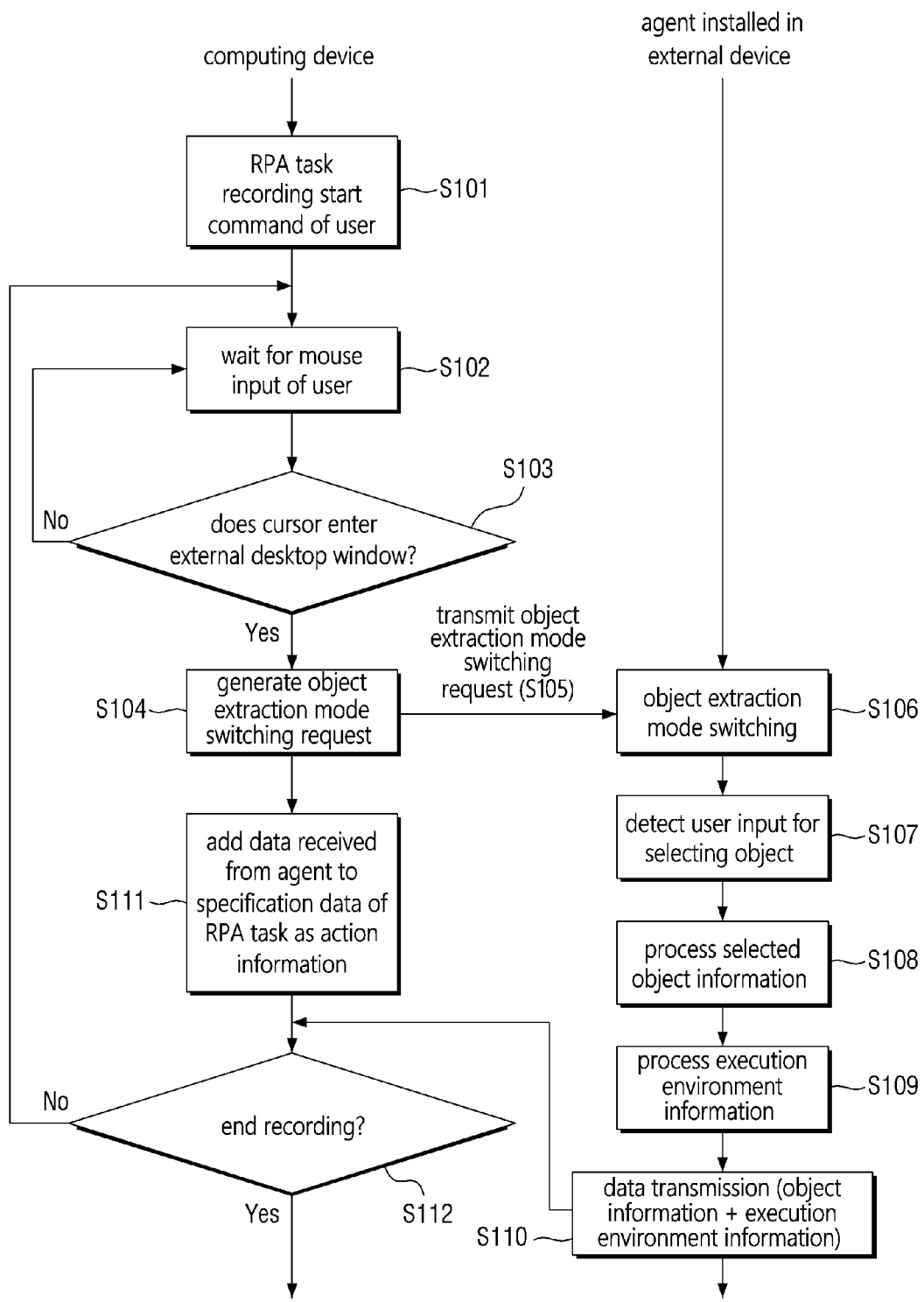
FIG. 3 is a signal flow chart illustrating a method for recording an RPA task according to another embodiment of the present disclosure.

Next, the method for recording the RPA task according to another embodiment of the present disclosure will be described with reference to FIG. 3. The method for recording RPA task recording method according to the present embodiment may be performed by one or more computing devices. That is, all operations of the method for recording the RPA task according to the present embodiment may be performed by one computing device, and some operations thereof may be performed by another computing device. For example, some operations may be performed by a first server system, and other operations may be performed by a second server system.

In addition, as the server system is implemented on a cloud computing node, operations performed by one server system may be divisionally performed on the plurality of cloud computing nodes. In the description of the method for recording the RPA task according to the present embodiment, a description of a subject performing some operations may be omitted, and in this case, the subject may be the user terminal 20 described with reference to FIG. 1.

In addition, the technical spirits that may be recognized with reference to the description of the RPA system described above may be applied to the method for recording the RPA task according to the present embodiment even though it is not separately specified in the present embodiment.

The description will be given with reference to FIG. 3. The 'computing device' shown in FIG. 3 indicates all types of computing devices used by a user. For example, the computing device shown in FIG. 3 may be the user terminal 20 described with reference to FIG. 1. In addition, the 'agent installed in the external device' shown in FIG. 3 indicates software installed in the 'external device', which is a computing device providing an external desktop, and always executed in the background. Hereinafter, the 'agent installed in the external device' will be abbreviated as an 'agent'.

The computing device receives an RPA task recording start command from a user (S101) and waits for a mouse input of the user (S102). Various user inputs, such as a keyboard or touch input, as well as the mouse input may be monitored.

The computing device detects whether a cursor enters an area of the external desktop window as a result of the monitoring (S103). When the cursor enters the area of the external desktop window (S103), the computing device generates an object extraction mode switching request (S104) and transmits the object extraction mode switching request to the agent (S105). As described above, since the agent is always executed on the operating system of the external device, the agent may receive the object extraction mode switching request. When the object extraction mode switching request is already transmitted within a predetermined time so that an unnecessary load is not applied to the agent, the computing device may not perform the steps S104 and S105 of generating and transmitting the object extraction mode switching request.

When the object extraction mode switching request is received (S105), the agent switches an operation mode to an object extraction mode (S106). The agent of the object extraction mode detects manipulation for the external desktop of the user. The agent of the object extraction mode detects a user input for selecting a specific object (S107) and processes the selected object information (S108). The agent of the object extraction mode may process the object information such that attribute information, such as an image of the selected object and a text corresponding to the selected object, is included in the object information. Table 1 below is exemplary object information processed in the above-described manner.

TABLE 1

```
<Object>
  <Rectangle left="10", top="40", width = 100, height ="50">
  <Name="Presentation">
  <Text="Presentation – Powerpoint">
  <Image>data:image/jpeg:base64,iVBORw0KGgoAAAANSUhEUgAAABKAAAAZ
..., </Image> ...
</Object>
```

Figure 4:
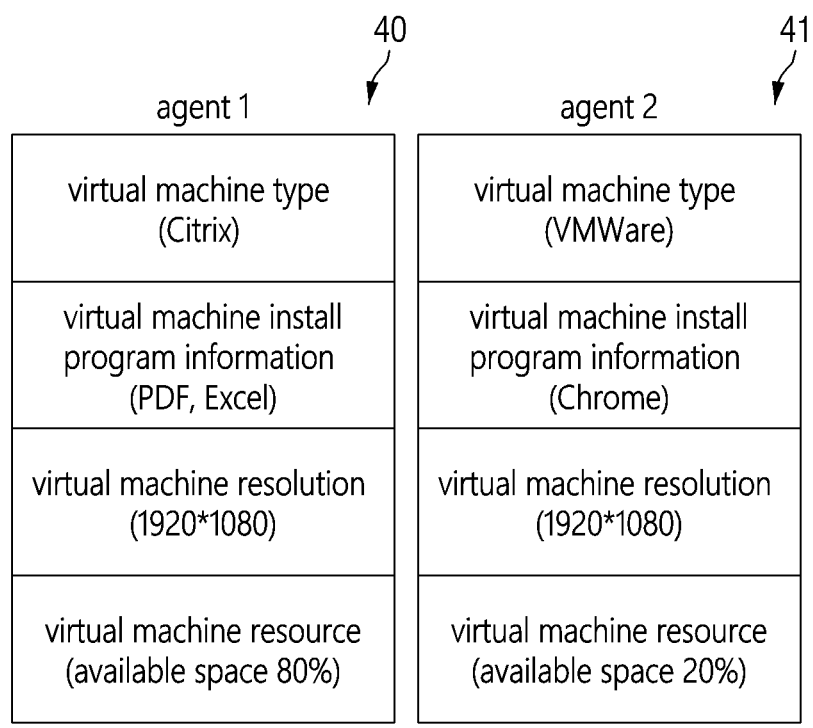
FIG. 4 is a view illustrating an exemplary execution environment information configured by an agent in some embodiments of the present disclosure.

In some embodiments, the agent may additionally process the execution environment information of the external desktop on which the agent is executed, as well as the object information (S109). Referring to FIG. 4, the execution environment information may include execution environment type information, installed application information, resolution information and hardware available resource information. The agent may process the execution environment information to have a predesignated format.

The execution environment type information may include operating system information. In addition, when the external desktop is provided by the operating system installed in the virtual machine, the execution environment type information may include virtual machine type information. The execution environment type information may be included in the specification data of the recorded RPA task as execution environment information in order to satisfy that an RPA producer that has recorded the RPA task desires to execute the recorded RPA task by using an external desktop of a specific execution environment type.

When the RPA task to be recorded includes a first action for manipulating a specific application, the first action may be executed in a desktop in which the specific application is installed. Therefore, application information installed in the desktop on which the action is performed may be included in the execution environment information, so that an appropriate execution environment in which the first action for manipulating a specific application may be executed may be obtained.

Also, in the recording situation of the RPA task, screen resolution of the external desktop and screen resolution of the external desktop when the RPA task is later executed should be the same as each other if possible, so that the object related to the action may be accurately found. In consideration of this point, resolution information may be included in the execution environment information.

Also, hardware-available resource information may be included in the execution environment information. The external desktop having an available resource that does not reach a minimum requirement with reference to the hardware available resource information may be excluded from the execution device of the RPA task at the time when the RPA task is later executed.

Also, in some embodiments, in the recording situation of the RPA task, the available resource situation of the external desktop and the available resource situation of the external desktop when the RPA task is later executed may be the same as each other if possible. For example, it is assumed that the second action is executed on the first external desktop in the recording situation of the RPA task. At this time, when a CPU usage rate is 30% and a memory usage rate is 50%, in the later execution situation of the RPA task, the execution device for executing the second action may be given a higher suitability as the CPU usage rate of 30% and the memory usage rate of 50% becomes similar to the available resource situation.

Table 2 below is exemplary execution environment information generated in the above-described manner.

TABLE 2

```
<Object>
   <key="Target_RemoteAppName" value="RDP">
   <key="Target_RemoteAppInstallProgramName"
   value="PowerPoint;Excel;Chrome">
   <key="Target_RemoteAppResolution" value="1920*1080">
   <key="Target_RemoteAppResource" value="34">
   ...
</Object>
```

Again, the description will be given with reference to FIG. 3. The agent transmits the object information and the execution environment information to the computing device (S110). The operations of the steps S102 to S110 are repeated continuously until the user inputs an RPA task recording end command, so that the specification data of the RPA task may be completed.

The method for recording the RPA task according to the present embodiment has been described as above. Although only one agent is shown in FIG. 3, the present embodiment has been described based on such a situation. However, in a situation in which two or more external desktop windows are displayed on the desktop screen of the computing device, actions of the RPA task may be performed using objects displayed on two or more external desktop windows. In this case, information on objects of two or more external desktops will be included in the specification data of the RPA task.

Figure 5:
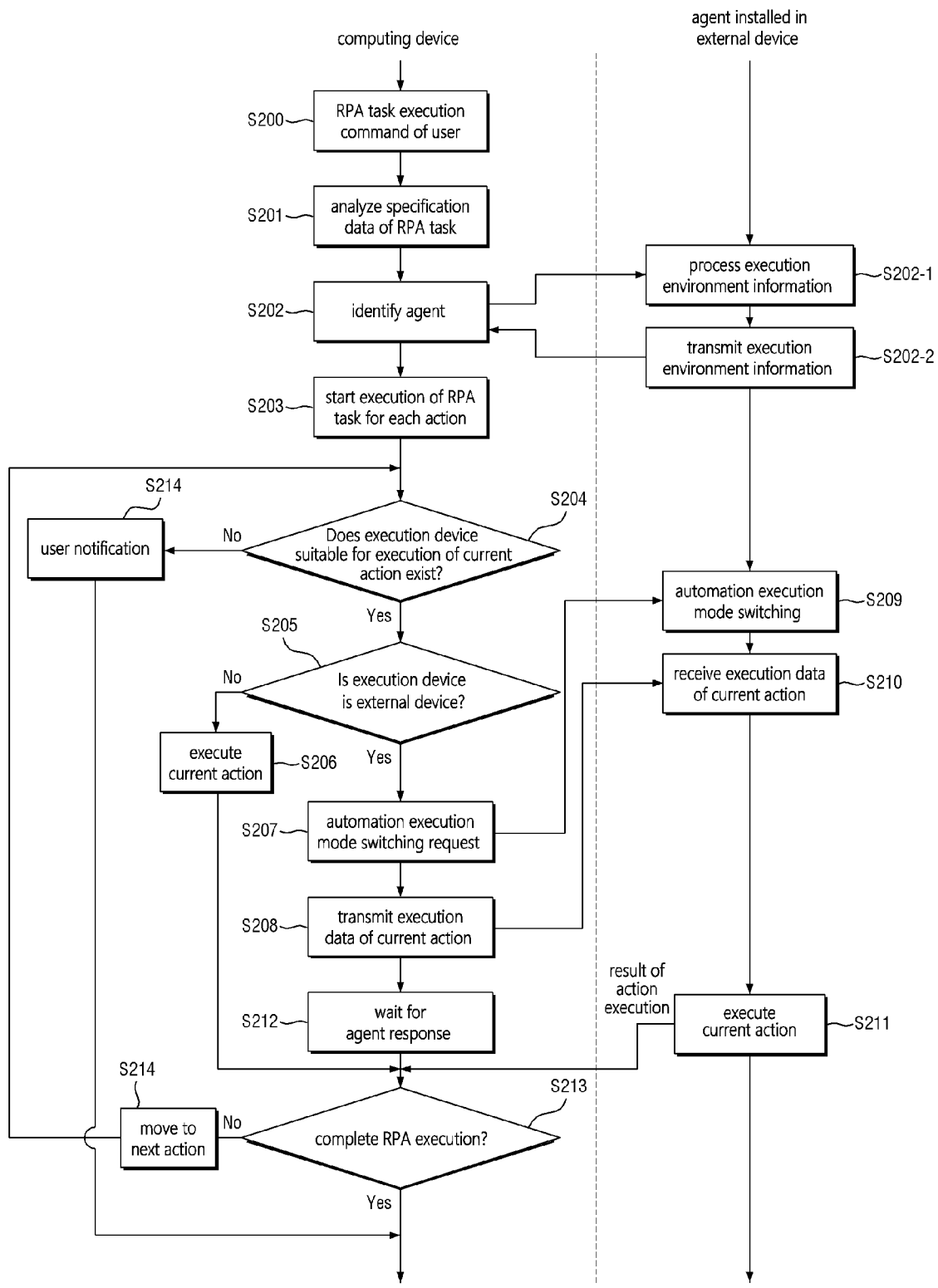
FIGS. 5 to 7 are signal flow charts illustrating methods for executing an RPA task according to still another embodiment of the present disclosure.
Figure 6:
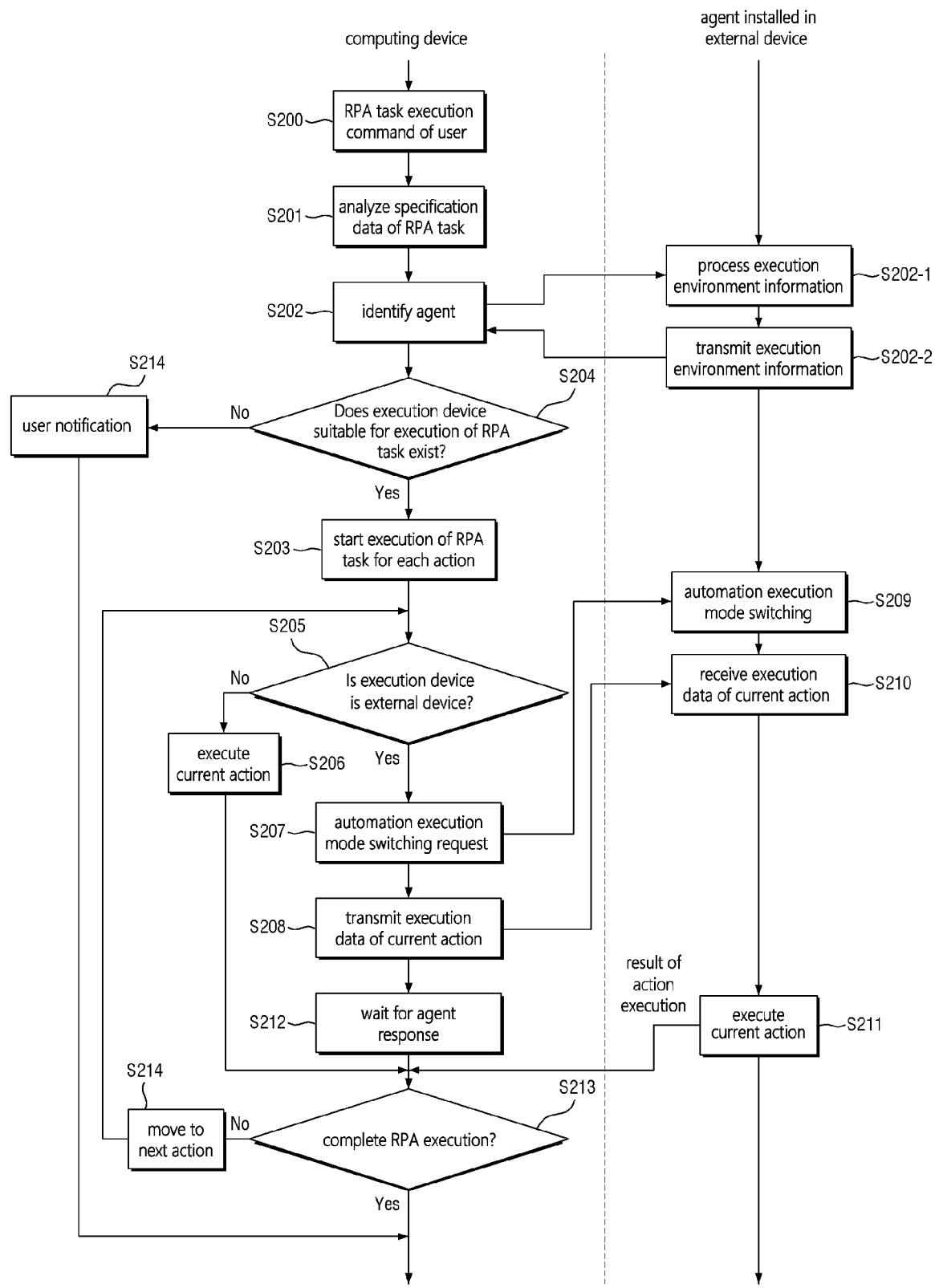
Figure 7:
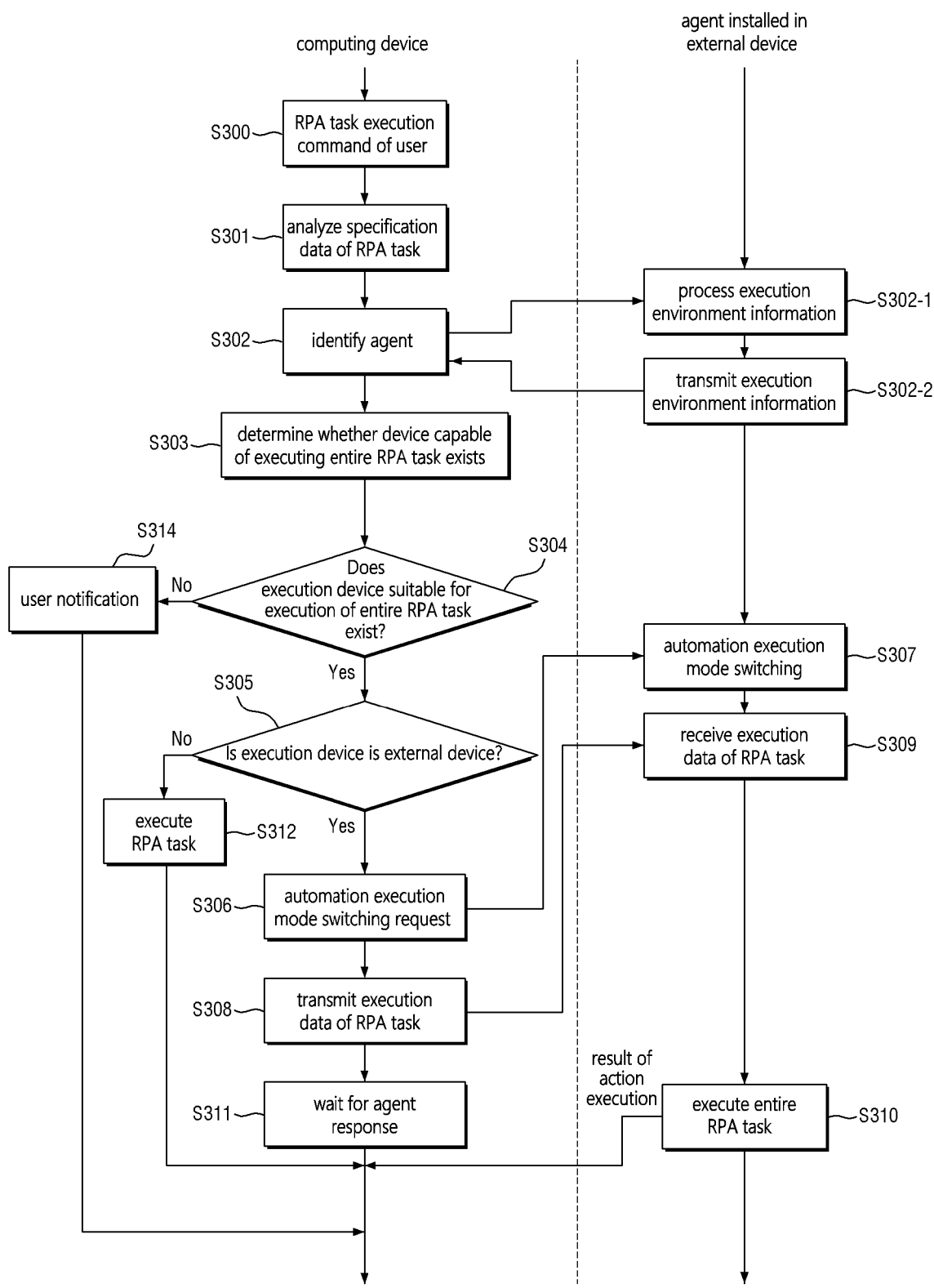

Hereinafter, methods for executing an RPA task according to still another embodiments of the present disclosure will be described with reference to FIGS. 5 to 7. The method for executing an RPA task according to the present embodiment may be performed by one or more computing devices. That is, in the method for executing an RPA task according to the present embodiment, all operations may be performed by one computing device, and some operations may be performed by another computing device. For example, some operations may be performed by the first server system and other operations may be performed by the second server system.

In addition, as the server system is implemented on the cloud computing node, operations performed by one server system may be divisionally performed on the plurality of cloud computing nodes. In describing the method for executing an RPA task according to the present embodiment, a description of a subject for performing some operations may be omitted, and in this case, the subject may be the user terminal 20 described with reference to FIG. 1.

In addition, the technical spirits that may be recognized with reference to the description of the RPA system described above may be applied to the method for recording the RPA task according to the present embodiment even though it is not separately specified in the present embodiment.

The description will be given with reference to FIG. 5. The 'computing device' shown in FIG. 5 indicates all types of computing devices used by a user. For example, the computing device shown in FIG. 5 may be the user terminal 20 described with reference to FIG. 1. In addition, the 'agent installed in the external device' shown in FIG. 5 indicates software installed in the 'external device', which is a computing device providing an external desktop, and always executed in the background. Hereinafter, the 'agent installed in the external device' will be abbreviated as an 'agent'.

The computing device receives an RPA task execution command from a user (S200) and analyzes specification data of the execution target RPA task (S201). The specification data may be a markup language-based script file of the RPA task. The computing device may identify object information and execution environment information for each action constituting the RPA task through analysis of the specification data.

Next, the computing device may identify an agent of each external desktop in which an external desktop window is generated on a desktop screen provided by the operating system of the computing device (S202).

As described above, in some other embodiments, the computing device may identify an agent of every external desktop connected to the computing device regardless of whether the external desktop window is displayed on the desktop screen of the computing device.

The computing device transmits a request for providing execution environment information to the identified agent, and the agent may process the execution environment information (S202-1) and transmit the processed execution environment information (S202-2) by receiving the request for providing execution environment information. The execution environment information will be processed by the agent with reference to the features described with reference to FIGS. 3 and 4.

Next, the computing device starts to sequentially execute each action of the RPA task (S203).

In step S204, the computing device finds an execution device suitable for execution of a current action, which is an action for an execution target, and determines whether the execution device exists. The process of finding the execution device will be performed with reference to execution environment information of the current action. That is, the computing device may find an execution device having an execution environment corresponding to the execution environment information of the current action written in the specification data of the RPA task. The execution device may be any one of an external device providing each external desktop in which the external desktop window is generated on the desktop screen provided by the operating system of the computing device or an external device providing the external desktop connected to the computing device.

When both the computing device and the external device are matched with the execution environment information of the current action, the computing device will be determined as the execution device. This is because that execution of the RPA task on the desktop screen of the computing device rather than the external desktop has a higher probability of success of execution.

When both the computing device and the external device satisfy only a portion of respective items constituting the execution environment information, the computing device may determine whether the computing device or the external device, which satisfies all essential items of the items of the execution environment information, exists. The computing device may determine the computing device or the external device, which satisfies all essential items of the items of the execution environment information, as the execution device.

As described above, the execution environment information may include execution environment type information, installed application information, resolution information and hardware available resource information, and an essential item required to be necessarily satisfied to be an execution device among the execution environment information may be the installed application information and the resolution information. Also, in some embodiments, the execution environment information may be application information in which the essential item is installed, resolution information and hardware available resource information.

When the execution device does not exist, the computing device displays a user notification message (S214) and stops execution of the RPA task. That is, both the operating system of the computing device and the external desktop to which the computing device is connected may not satisfy the execution environment required for the current action. In this case, the user terminal 20 may display a notification message indicating that execution of the specific action is impossible and stop the execution of the RPA task.

On the other hand, in some embodiments, when there is no external desktop corresponding to the execution environment information, an external device providing an external desktop corresponding to the received execution environment information among connectable desktops previously registered by a user of the computing device may be determined as the execution device of the identified action.

To this end, the computing device may additionally instantiate the external desktop by newly generating a window of the connectable desktop previously registered by the user of the computing device when there is no external desktop matched with the received execution environment information. For this instantiation, the computing device may store login information of the connectable desktop previously registered by the user.

Also, in some embodiments, when there is no external desktop matched with the received execution environment information, the computing device may be newly connected to the connectable desktop previously registered by the user and determine an external device providing the newly connected external desktop as the execution device of the identified action.

In step S205, the computing device checks whether the execution device is an external device or the computing device, and executes the current action when the execution device is the computing device itself.

When the execution device is an external device, the computing device transmits a switching request to an automation execution mode to the agent installed in the execution device (S207). The agent receives the switching request to the automation execution mode and switches the execution mode to the automation execution mode (S209).

The computing device transmits data for the execution of the current action to the agent after transmitting the switching request to the automation execution mode (S208). The data for executing the current action may include data defining an action and data defining an object that is a target for the action. The agent receives data for the execution of the current action (S210) and executes the action as defined in the received data (S211). For example, the agent may find an object, which is a target for the action, from the desktop screen and generate a click manipulation for the found object. The computing device waits for a response of the agent after transmitting data for execution of the current action to the agent (S212), and when the computing device receives an action execution result from the agent, the waiting state will be released.

The computing device repeatedly performs steps S204 to S212 while moving to next action until the remaining actions included in the RPA task are no longer present.

The method for executing an RPA task according to the present embodiment described with reference to FIG. 5 separately process the RPA task in a unit of each action.

Meanwhile, in a situation in which execution of a specific action is impossible, among the actions included in the RPA task, the actions prior to the specific action of which execution is not impossible will be normally executed. That is, a situation in which only a partial action of the RPA task is executed may occur. It may be preferable that the RPA task is entirely executed or not entirely executed. That is, it may be preferable that the execution of the RPA task also satisfies the atomicity.

In order to satisfy the atomicity in the execution of RPA task, the RPA system according to the present embodiment may previously check whether all actions included in the RPA task can be executed before the execution of the RPA task starts. In this regard, the description will be given with reference to FIG. 6. For convenience of understanding, the description will be based on the modified operation with respect to FIG. 5.

The computing device analyzes specification data of the RPA task (S201) and performs agent identification (S202) when an RPA task execution command is input (S200). Next, before execution for each action starts, the computing device determines whether an execution device suitable for execution of the RPA task exists (S204). In more detail, the computing device may identify each action constituting the RPA task by using the acquired specification data, determine an execution environment of the identified action, determine the execution device of the identified action as any one of the computing device and an external device corresponding to the external desktop connected to the computing device by using the determined execution environment, and may repeat the step of determining the execution environment and the step of determining the execution device of the identified action as any one of the computing device and the external device with respect to each identified action.

When there is any one action that the execution device cannot be determined (S204), the computing device may display a notification message and stop the execution of the RPA task (S214). On the other hand, in some embodiments, when an action cannot be determined by the execution device, an external device providing an external desktop corresponding to the received execution environment information among connectable desktops previously registered by a user of the computing device may be determined as the execution device. To this end, the computing device may additionally instantiate the external desktop by newly generating a window of the connectable desktop previously registered by the user of the computing device when there is no external desktop matched with the received execution environment information. Also, in some embodiments, when there is no external desktop matched with the received execution environment information, the computing device may be newly connected to the connectable desktop previously registered by the user and determine an external device providing the newly connected external desktop as the execution device.

Next, the computing device starts execution for each action (S203). The operation of performing execution for each action will be understood with reference to the description made with reference to FIG. 5.

Next, a method for executing an RPA task according to another embodiment of the present disclosure will be described with reference to FIG. 7. In the present embodiment, it may be understood that the entire RPA task is executed by the computing device itself or is executed by the external device.

The computing device analyzes specification data of the RPA task (S301) and performs agent identification (S302) when an RPA task execution command is input (S300). In the process of identifying the agent, the agent may process the execution environment information (S302-1) and transmit the processed execution environment information to the computing device (S302-2).

Next, before execution for each action starts, the computing device determines whether an execution device suitable for execution of the entire RPA task is present (S404). In more detail, the computing device may identify each action constituting the RPA task by using the acquired specification data, determine a comprehensive execution environment of the RPA task by using the execution environment of the identified action and determine the execution device of the RPA task as the computing device when the execution environment of the computing device is suitable for the determined comprehensive execution environment. In this case, the computing device may determine the comprehensive execution environment by synthesizing all of the execution environments of the identified action under 'AND conditions'.

When the execution device cannot be determined (S304), the computing device may display a notification message and stop the execution of the RPA task (S314). On the other hand, in some embodiments, when the execution device cannot be determined, an external device providing an external desktop corresponding to the comprehensive execution environment among the connectable desktops previously registered by a user of the computing device may be determined as the execution device.

To this end, the computing device may additionally instantiate the external desktop by newly generating a window of the connectable desktop previously registered by the user of the computing device when there is no external desktop matched with the comprehensive execution environment. Also, in some embodiments, when there is no external desktop matched with the comprehensive execution environment information, the computing device may be newly connected to the connectable desktop previously registered by the user and determine an external device providing the newly connected external desktop as the execution device.

Next, the computing device executes the RPA task. The RPA task may be required to be executed by the computing device (S305 and S312), or the RPA task may required to be executed by the external device (S306 to S311). However, according to one embodiment of the present disclosure, unlike the description made with reference to FIGS. 5 and 6, when information for action execution for each action is not transmitted to the agent and the external device is the execution device, the specification data of the RPA task may be transmitted to the external device. Therefore, the agent receives the execution data of the entire RPA task (S309) and executes the entire RPA task (S310).

Figure 8:
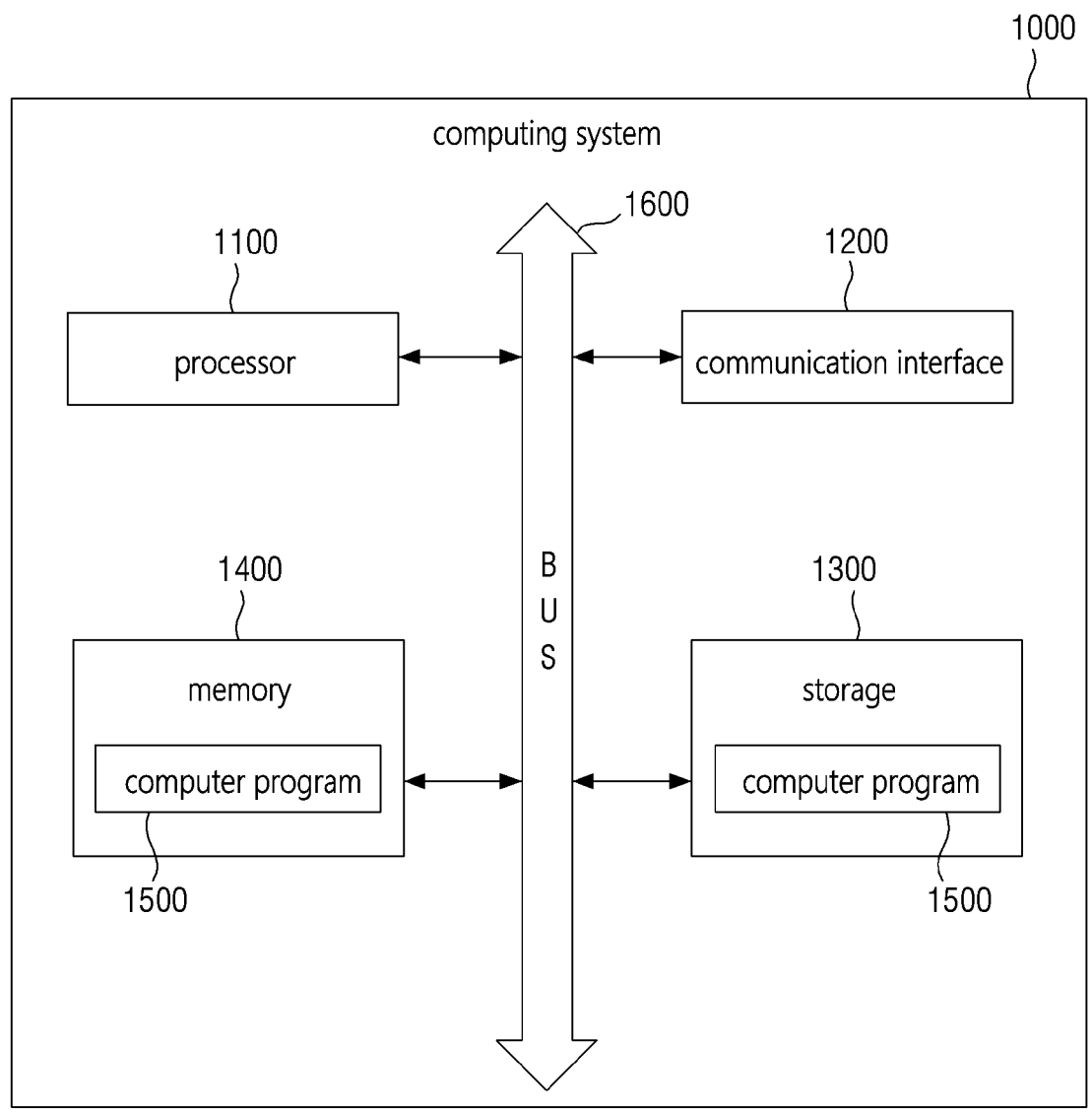
FIG. 8 is a hardware schematic view illustrating a computing system described in some embodiments of the present disclosure.

FIG. 8 is a hardware schematic view illustrating a computing system according to some embodiments of the present disclosure. The computing system 1000 of FIG. 8 may include one or more processors 1100, a system bus 1600, a communication interface 1200, a memory 1400 for loading a computer program 1500 performed by the processor 1100, and a storage 1300 for storing the computer program 1500. For example, the computing system of FIG. 8 may be the user terminal 20 described with reference to FIGS. 1 and 2.

The processor 1100 controls the overall operation of each component of the computing system 1000. The processor 1100 may perform a computation for at least one application or program for executing the method/operation according to various embodiments of the present disclosure. The memory 1400 stores various data, commands and/or information. The memory 1400 may load one or more computer programs 1500 from the storage 1300 to execute the method/operations according to various embodiments of the present disclosure. The storage 1300 may non-temporarily store one or more computer programs 1500. The computer program 1500 may include one or more instructions in which the method/operations according to various embodiments of the present disclosure are implemented. When the computer program 1500 is loaded into the memory 1400, the processor 1100 may execute the one or more instructions to perform the method/operations according to various embodiments of the present disclosure.

The computer program 1500 for executing an RPA task may include an instruction for receiving specification data of the RPA task through a communication interface, an instruction for receiving an execution command of the RPA task from a user terminal, and an instruction for executing the RPA task in response to the reception of the execution command of the RPA task. Also, the instruction for executing the RPA task may include an instruction for identifying each action constituting the RPA task by the acquired specification data, an instruction for determining an execution environment of the identified action, an instruction for determining an execution device of the identified action as any one of the computing device and an external device corresponding to an external desktop connected to the computing device by using the determined execution environment, an instruction for transmitting data for execution of the identified action to an agent of the external desktop displayed on the computing device when the execution device of the identified action is determined as the external device, and an instruction for repeating the step of determining the execution environment, the step of determining the execution device of the identified action as any one of the computing device and the external device and the step of transmitting the data for execution of the identified action in accordance with the order of each identified action.

Also, the computer program 1500 for recording the RPA task may include an instruction for receiving object information on an object selected by a user input for selecting the object inside a window region of an external desktop from an agent of the external desktop in response to the user input in a recording situation of the RPA task, and an instruction for adding action information to the specification data of the RPA task by using the received object information.

In some embodiments, the computing system 1000 described with reference to FIG. 8 may be configured using one or more physical servers included in a server farm based on a cloud technology such as a virtual machine. In this case, among the components shown in FIG. 6, at least some of the processor 1100, the memory 1400 and the storage 1300 may be virtual hardware, and the communication interface 1200 may be also configured as a virtualized networking component such as a virtual switch.

Although operations are shown in a specific order in the drawings, it should not be understood that desired results can be obtained when the operations must be performed in the specific order or sequential order or when all of the operations must be performed. In certain situations, multitasking and parallel processing may be advantageous. In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation. The protection scope of the present invention should be interpreted by the following claims, and all technical ideas within the equivalent range should be interpreted as being included in the scope of the technical ideas defined by the present disclosure.

What is claimed is:

1. A method for recording a robotics process automation (RPA) task, performed by a computing device, the method comprising:
   acquiring specification data of the RPA task;
   identifying each action constituting the RPA task by using the acquired specification data;
   determining an execution environment of the identified action;
   determining an execution device of the identified action as any one of the computing device and an external device corresponding to an external desktop connected to the computing device by using the determined execution environment;
   transmitting data for execution of the identified action to an agent of the external desktop connected to the computing device when the execution device of the identified action is determined as the external device; and
   repeating the determining the execution environment, the determining the execution device of the identified action as any one of the computing device and the external device and the transmitting the data for execution of the identified action in accordance with the order of each identified action.

2. The method of claim 1, further comprising receiving execution environment information from the agent of each external desktop connected to the computing device,
   wherein the determining the execution device of the identified action as any one of the computing device and the external device includes:

determining whether the computing device can execute the identified action by using the execution environment of the identified action;

determining the execution device of the identified action as the computing device when it is determined that the computing device is capable of executing the identified action; and determining the execution device of the identified action as one of respective external desktops by using the received execution environment information when it is determined that the identified action is not capable of being executed in the computing device.

3. The method of claim 2, further comprising receiving a user input indicating the execution of the RPA task, wherein the receiving the execution environment information includes receiving the execution environment information in response to the receiving the user input.

4. The method of claim 2, wherein the execution environment information includes execution environment type information, installed application information, resolution information, and hardware available resource information.

5. The method of claim 4, wherein the determining the execution device of the identified action as one of the respective external desktops by using the received execution environment information includes:

determining, as the execution device of the identified action, an external desktop having execution environment information in which the execution environment type information, the installed application information, the resolution information and the hardware available resource information among the received execution environment information are matched with the execution environment of the identified action; and determining, as the execution device of the identified action, an external desktop satisfying only some essential information among the execution environment type information, the installed application information, the resolution information and the hardware available resource information when there is no external desktop having execution environment type information in which the execution environment type information, the installed application information, the resolution information and the hardware available resource information among the received execution environment information are matched with the execution environment of the identified action.

6. The method of claim 2, wherein the determining the execution device of the identified action as one of the respective external desktops by using the received execution environment information includes displaying a notification message and stopping execution of the RPA task when there is no external desktop matched with the received execution environment information.

7. The method of claim 2, wherein the determining the execution device of the identified action as one of the respective external desktops by using the received execution environment information includes determining, as the execution device of the identified action, an external desktop, which is matched with the received execution environment information, among connectable desktops previously registered by a user of the computing device when there is no external desktop matched with the received execution environment information.

8. The method of claim 7, wherein the determining, as the execution device of the identified action, the external desktop, which is matched with the received execution environment information, among connectable desktops previously registered by the user of the computing device includes:

newly connecting the computing device to connectable desktops previously registered by the user of the computing device when there is no external desktop matched with the received execution environment information; and determining, as the execution device of the identified action, an external desktop matched with the received execution environment information among the newly connected external desktops.

9. A computing system comprising:

a communication interface connected with a user terminal;

a processor; and a memory storing a computer program loaded on the processor, wherein the computer program includes:

an instruction for receiving specification data of a robotics process automation (RPA) task through the communication interface;

an instruction for receiving an execution command of the RPA task from the user terminal; and an instruction for executing the RPA task in response to reception of the execution command of the RPA task, the instruction for executing the RPA task includes:

an instruction for identifying each action constituting the RPA task by using the acquired specification data;

an instruction for determining an execution environment of the identified action;

an instruction for determining an execution device of the identified action as any one of the computing system and an external device corresponding to an external desktop connected to the computing system by using the determined execution environment;

an instruction for transmitting data for execution of the identified action to an agent of the external desktop displayed on the computing system when the execution device of the identified action is determined as the external device; and an instruction for repeating the determining the execution environment, the determining the execution device of the identified action as any one of the computing system and the external device and the transmitting the data for execution of the identified action in accordance with the order of each identified action.

10. The computing system of claim 9, wherein the computing system provides a remote desktop service to the user terminal.

11. A method for executing a robotics process automation (RPA) task, performed by a computing device, the method comprising:

acquiring specification data of the RPA task;

identifying each action constituting the RPA task by using the acquired specification data;

determining an execution environment of the identified action;

determining an execution device of the identified action as any one of the computing device and an external device corresponding to an external desktop connected to the computing device by using the determined execution environment;

repeating the determining the execution environment and the determining the execution device of the identified action as any one of the computing device and the external device for each identified action;

executing the identified action when the determined execution device of the identified action is the computing device;

transmitting data for execution of the identified action to an agent corresponding to the external device when the determined execution device of the identified action is the external device; and repeating the executing the identified action and the transmitting the data for execution of the identified action to the agent corresponding to the external device in accordance with the order of each identified action.

12. The method of claim 11, wherein the determining the execution device of the identified action as any one of the computing device and an external device corresponding to an external desktop connected to the computing device includes displaying a notification message and stopping execution of the RPA task when the execution device of the identified action cannot be determined.

13. The method of claim 11, wherein the determining the execution device of the identified action as any one of the computing device and an external device corresponding to the external desktop connected to the computing device includes:

determining, as the execution device of the identified action, an external desktop, which is matched with the received execution environment information, among connectable desktops previously registered by a user of the computing device; and newly connecting the computing device to the external desktop determined as the execution device.

14. A method for executing a robotics process automation (RPA) task, performed by a computing device, the method comprising:

acquiring specification data of the RPA task;

identifying each action constituting the RPA task by using the acquired specification data;

determining a comprehensive execution environment of the RPA task by using an execution environment of the identified action;

determining an execution device of the RPA task as the computing device when an execution environment of the computing device is matched with the determined comprehensive execution environment; and determining an external desktop matched with the determined comprehensive execution environment among external desktops connected to the computing device as the execution device of the RPA task and transmitting the specification data of the RPA task to the execution device of the RPA task when at least a portion of the execution environment of the computing device is not matched with the determined comprehensive execution environment.

15. The method of claim 14, wherein the determining the comprehensive execution environment of the RPA task includes determining the comprehensive execution environment by synthesizing all of execution environments of the identified action under 'AND conditions'.

* * * * *